United States Patent [19]

Gallien et al.

[11] 4,251,750

[45] Feb. 17, 1981

[54] FLUORESCENT LAMP FOR USE IN LIQUID ANALYSIS

[75] Inventors: John P. Gallien; Francis P. Mackey, both of Danvers; Tadius T. Sadoski, Salem; Fred R. Taubner, Danvers, all of Mass.

[73] Assignee: GTE Products Corporation, Stamford, Conn.

[21] Appl. No.: 24,650

[22] Filed: Mar. 28, 1979

[51] Int. Cl.³ .............................................. H01J 61/44
[52] U.S. Cl. .................................. 313/487; 313/488; 356/39
[58] Field of Search ............... 313/487, 486, 485, 488; 356/39

[56] References Cited

U.S. PATENT DOCUMENTS

| | | | |
|---|---|---|---|
| 3,463,142 | 8/1969 | Harte | 356/39 X |
| 3,480,785 | 11/1969 | Aufderheide | 356/71 |
| 3,565,535 | 2/1971 | Monell | 356/39 X |
| 3,625,621 | 12/1971 | Fields | 356/435 |
| 3,748,517 | 7/1973 | Haft | 313/487 |
| 3,819,271 | 6/1974 | Beug et al. | 356/39 |
| 4,029,983 | 6/1977 | Thornton | 313/487 X |

Primary Examiner—Palmer C. Demeo
Attorney, Agent, or Firm—James Theodosopoulos

[57] ABSTRACT

A fluorescent lamp contains a blend of phosphors to provide predetermined minimum power levels of radiation at predetermined spectral bands that are used in the analysis of liquid samples placed close to the lamp.

2 Claims, 1 Drawing Figure

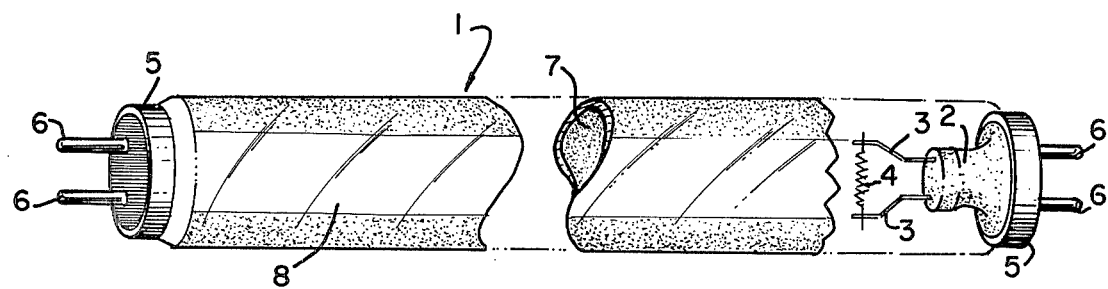

FLUORESCENT LAMP FOR USE IN LIQUID ANALYSIS

THE INVENTION

This invention concerns lamps providing spectral radiation in a range that is useful in particular types of analytical instruments, for example, blood analyzers. In such instruments, the liquid sample to be analyzed is disposed in a cuvette and placed close to the lamp, with a detector being placed on the opposite side of the cuvette. Up to fifteen analyses may be performed in an analyzer at one time. These particular spectral frequencies and spectral bands fall within the range of about 340 to 680 nanometers.

Generally, incandescent lamps have been used in such instruments. However, there are several disadvantages to the use of incandescent lamps. They are deficient in radiation at the UV end of the spectrum, say, at about 400 nanometers and less. Also, incandescent lamps can emit undesirably large amounts of heat in the form of infrared radiation.

This invention discloses a lamp which overcomes the disadvantages of the prior art incandescent lamps. A lamp as per this invention comprises an aperture fluorescent lamp having a blend of phosphors to provide radiation in the 340 to 680 nanometer range with adequate power levels at predetermined bands within the range. The phosphor blend comprises four narrow band emitting phosphors and two broad band emitting phosphors. The narrow band phosphors emit in the near ultraviolet and the green regions of the spectrum. The broad band phosphors peak at about the yellow and red regions of the spectrum.

The single FIGURE in the drawing is an elevational view, partly in section, of a fluorescent lamp in accordance with this invention.

The lamp comprises an elongated tubular glass envelope 1 sealed at each end by a glass stem 2 through which extend lead-in wires 3 the internal ends of which support the usual coiled electrode 4. There is a base 5 at each end of the lamp from which extend the usual contact prongs 6. Envelope 1 contains a filling of inert gas at low pressure, say, about 2 to 6 torr, and a small quantity of mercury that produces a mercury vapor pressure of about 2 to 10 microns during normal lamp operation.

Envelope 1 has a coating 7 of powdered phosphor on its interior surface, except for an aperture 8 which is devoid of phosphor. Such aperture lamps are well known. In operation, the cuvettes containing the samples to be analyzed are placed close to aperture 8, say, less than 50 mm therefrom.

Coating 7 comprised a blend of four narrow band phosphors and two broad band phosphors. The four narrow band phosphors were lead activated barium mesosilicate, europium activated strontium fluoroborate, cerium terbium magnesium aluminate, and manganese activated gallium magnesium oxide; the two broad band phosphors were antimony sensitized manganese activated calcium halophosphate, and tin activated strontium magnesium orthophosphate. The peak emissions of these six phosphors occurred at 351, 371, 546, 504, 582 and 628 nanometers respectively.

In a particular analyzer, the spectral energy requirements in terms of watts per square centimeter at a distance of one meter, were 1.494, 1.481, 0.894, 1.429, 0.789 and 0.627 for spectral bands 335–345, 375–385, 500–510, 535–545, 585–595 and 620–630 nanometers, respectively. The phosphor blend that was used to meet these requirements was as follows: 43% by weight of lead activated barium mesosilicate, 13% of europium activated strontium fluoroborate, 5% of cerium terbium magnesium aluminate, 12% of manganese activate gallium magnesium oxide, 13.5% of antimony sensitized manganese activated calcium halophosphate and 13.5% of tin activated strontium magnesium orthophosphate. The lamp in which this phosphor blend was placed was a F13WT5 fluorescent lamp having a 90° aperture running the full length of the lamp.

We claim:

1. A fluorescent lamp comprising a tubular glass envelope having electrodes at each end and containing a filling including inert gas and mercury, the glass envelope having a phosphor coating on its interior surface, said phosphor coating comprising a blend of phosphors that provides predetermined minimum power levels of radiation at predetermined spectral bands that are used in the analysis of liquid samples placed close to the lamp, said predetermined spectral bands being within the spectral range of about 340 to 680 nanometers, said blend of phosphors comprising two ultraviolet emitting narrow band phosphors, two green emitting narrow band phosphors, a wide band phosphor that peaks in the yellow region of the spectrum, and a wide band phosphor that peaks in the red region of the spectrum, said two ultraviolet emitting phosphors being lead activated barium mesosilicate and europium activated strontium fluoroborate, said two green emitting narrow band phosphors being cerium terbium magnesium aluminate and manganese activated gallium magnesium oxide, said yellow wide band phosphor being antimony sensitized manganese activated calcium halophosphate, and said red wide band phosphor being tin activated strontium magnesium orthophosphate.

2. The lamp of claim 1 wherein the respective quantities of said six phosphors are, by weight, about 43%, 13%, 5%, 12%, 13.5% and 13.5%.